(12) United States Patent
Graham et al.

(10) Patent No.: US 11,915,596 B2
(45) Date of Patent: Feb. 27, 2024

(54) METHODS AND SYSTEMS FOR RESOLVING TACTILE USER INPUT SELECTIONS

(71) Applicant: HONEYWELL INTERNATIONAL INC., Charlotte, NC (US)

(72) Inventors: Brock Graham, Phoenix, AZ (US); Rakshit R, Bangalore (IN); Thea Feyereisen, Minneapolis, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 294 days.

(21) Appl. No.: 17/452,707

(22) Filed: Oct. 28, 2021

(65) Prior Publication Data
US 2022/0148440 A1 May 12, 2022

(30) Foreign Application Priority Data
Nov. 11, 2020 (IN) .............................. 202011049227

(51) Int. Cl.
| | |
|---|---|
| G08G 5/00 | (2006.01) |
| G06F 3/0482 | (2013.01) |
| G06F 3/01 | (2006.01) |
| G06F 18/2431 | (2023.01) |

(52) U.S. Cl.
CPC ........... *G08G 5/0021* (2013.01); *G06F 3/016* (2013.01); *G06F 3/0482* (2013.01); *G06F 18/2431* (2023.01)

(58) Field of Classification Search
CPC .................................................. G08G 5/0021
USPC .......................................................... 701/14
See application file for complete search history.

(56) References Cited

U.S. PATENT DOCUMENTS

| | | | | |
|---|---|---|---|---|
| 4,542,386 A | * | 9/1985 | Delligatii | G01D 15/18 |
| | | | | 347/85 |
| 5,675,365 A | * | 10/1997 | Becerra | B41J 2/0458 |
| | | | | 347/14 |
| 6,227,641 B1 | * | 5/2001 | Nishikori | B41J 2/04563 |
| | | | | 347/17 |
| 6,303,909 B1 | * | 10/2001 | Fernando | G01N 13/00 |
| | | | | 73/866 |
| 7,539,478 B2 | * | 5/2009 | Herley | G06F 16/433 |
| | | | | 455/345 |
| 8,112,224 B2 | * | 2/2012 | Lucas | G08G 5/0052 |
| | | | | 701/16 |
| 8,453,055 B2 | | 5/2013 | Oh | |
| 8,812,995 B1 | | 8/2014 | Murphy | |
| 9,227,736 B2 | * | 1/2016 | Whitlow | G08G 5/0052 |
| 9,582,180 B2 | | 2/2017 | Shao et al. | |

(Continued)

FOREIGN PATENT DOCUMENTS

| | | |
|---|---|---|
| EP | 2500808 A1 | 9/2012 |
| EP | 3098702 A1 | 11/2016 |

(Continued)

*Primary Examiner* — Reza Nabi
(74) *Attorney, Agent, or Firm* — Lorenz & Kopf LLP

(57) ABSTRACT

Methods and systems are provided for resolving a selected graphical element corresponding to a tactile user input associated with a graphical user interface display on a display device associated with a vehicle, such as an aircraft. The tactile user input is classified based on its temporal duration, and the classification of the tactile user input influences the identification of the selected graphical element or other response to the tactile user input.

20 Claims, 7 Drawing Sheets

(56) References Cited

U.S. PATENT DOCUMENTS

| | | | |
|---|---|---|---|
| 9,791,995 B2 | 10/2017 | Dojo et al. | |
| 10,671,279 B2* | 6/2020 | Plank S | G06F 3/0482 |
| 10,803,684 B2 | 10/2020 | Gowda | |
| 10,839,805 B2 | 11/2020 | Jitkoff et al. | |
| 11,353,889 B1* | 6/2022 | Freiheit | G06N 20/00 |
| 2002/0014485 A1* | 2/2002 | Fernando | H05B 3/34 |
| | | | 219/535 |
| 2002/0154019 A1* | 10/2002 | Kimoto | G01N 33/0037 |
| | | | 340/529 |
| 2005/0015294 A1* | 1/2005 | Williams | G06Q 10/04 |
| | | | 705/7.29 |
| 2009/0015703 A1* | 1/2009 | Kim | H04N 23/631 |
| | | | 348/333.12 |
| 2009/0323845 A1* | 12/2009 | Bank | H04L 25/0238 |
| | | | 375/261 |
| 2013/0013133 A1* | 1/2013 | Walter | G08G 5/0021 |
| | | | 701/11 |
| 2013/0016042 A1* | 1/2013 | Makinen | G06F 3/04886 |
| | | | 345/173 |
| 2013/0145313 A1* | 6/2013 | Roh | G06F 3/04817 |
| | | | 715/802 |
| 2013/0149989 A1* | 6/2013 | Kwon | H04W 4/08 |
| | | | 455/566 |
| 2013/0268878 A1* | 10/2013 | Le Roux | G09B 9/08 |
| | | | 715/772 |
| 2015/0082162 A1* | 3/2015 | Cho | G06F 3/04883 |
| | | | 715/810 |
| 2015/0150095 A1* | 5/2015 | Mere | G01C 23/00 |
| | | | 726/4 |
| 2015/0242067 A1 | 8/2015 | Ainslie et al. | |
| 2015/0301737 A1* | 10/2015 | Koyama | G06F 3/04883 |
| | | | 715/810 |
| 2016/0179327 A1* | 6/2016 | Zammit-Mangion | G06F 3/0482 |
| | | | 701/3 |
| 2019/0161182 A1* | 5/2019 | Alfred | G05D 1/0061 |
| 2020/0134940 A1* | 4/2020 | Gowda | G06F 3/04847 |
| 2020/0169578 A1* | 5/2020 | Rousse | H04L 43/08 |
| 2021/0231050 A1* | 7/2021 | Olver | F15B 19/005 |
| 2022/0148440 A1* | 5/2022 | Graham | G06F 3/0488 |
| 2022/0204180 A1* | 6/2022 | Sellmann | G01C 23/005 |
| 2022/0204184 A1* | 6/2022 | Dowty | A61L 2/10 |
| 2022/0406196 A1* | 12/2022 | Freiheit | G08G 5/0021 |

FOREIGN PATENT DOCUMENTS

| | | |
|---|---|---|
| JP | 6482312 B2 | 8/2016 |
| WO | 2007037809 A1 | 4/2007 |

* cited by examiner

… (1) …

METHODS AND SYSTEMS FOR RESOLVING TACTILE USER INPUT SELECTIONS

CROSS-REFERENCE TO RELATED APPLICATION(S)

The present application claims benefit of prior filed Indian Provisional Patent Application No. 202011049227, filed Nov. 11, 2020, which is hereby incorporated by reference herein in its entirety.

TECHNICAL FIELD

The subject matter described herein relates generally to vehicle systems, and more particularly, embodiments of the subject matter relate to aircraft systems and related cockpit touchscreen displays.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. In some instances, a cockpit display may have a limited viewable area for a user to review the displayed information and make selections. This can be an issue due to the amount of information and selectable elements that may be displayed. For example, when displayed elements overlap or are otherwise positioned in close proximity, in order to select a desired element, a pilot may have to pan or otherwise navigate within the display to center or focus the displayed area on the desired element or area for selection, and then zoom in or otherwise change the range or scale of the displayed area to achieve sufficient spatial differentiation among elements to enable selection of the desired element. Manipulating the display in such a manner to arrive at the desired selection may be time consuming, inefficient, error prone, and distracting. Accordingly, it is desirable to improve the navigability of, and ease of interaction with, a displayed route of travel. Furthermore, other desirable features and characteristics will become apparent from the subsequent detailed description and the appended claims, taken in conjunction with the accompanying drawings and this background.

BRIEF SUMMARY

Methods and systems are provided for resolving a user selection received via a tactile user interface. One method involves identifying a plurality of selectable graphical elements within a threshold distance of a tactile user input on a display device, classifying the tactile user input into one of a plurality of categories based on a temporal characteristic associated with the tactile user input and determining a selected graphical element of the plurality of selectable graphical elements within the threshold distance of the tactile user input on the display device corresponding to the user selection in accordance with the temporal classification of the tactile user input.

In another embodiment, a non-transitory computer-readable medium is provided having computer-executable instructions stored thereon that, when executed by a processing system, cause the processing system to identify a plurality of selectable graphical elements within a threshold distance of a tactile user input on a display device, classify the tactile user input into one of a plurality of categories based on a temporal characteristic associated with the tactile user input, and determine a selected graphical element of the plurality of selectable graphical elements within the threshold distance of the tactile user input on the display device in accordance with the temporal classification of the tactile user input.

In another embodiment, a system is provided that includes a display device having a graphical user interface (GUI) display depicted thereon, a user interface to receive a tactile user input with respect to the GUI display, and a processing system coupled to the display device and the user interface to identify a plurality of selectable graphical elements on the GUI display within a threshold distance of the tactile user input, classify the tactile user input into one of a plurality of categories based on a temporal characteristic associated with the tactile user input, resulting in a temporal classification of the tactile user input, determine a selected graphical element of the plurality of selectable graphical elements within the threshold distance of the tactile user input on the display device in accordance with the temporal classification of the tactile user input, and update the GUI display to reflect user selection of the selected graphical element.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
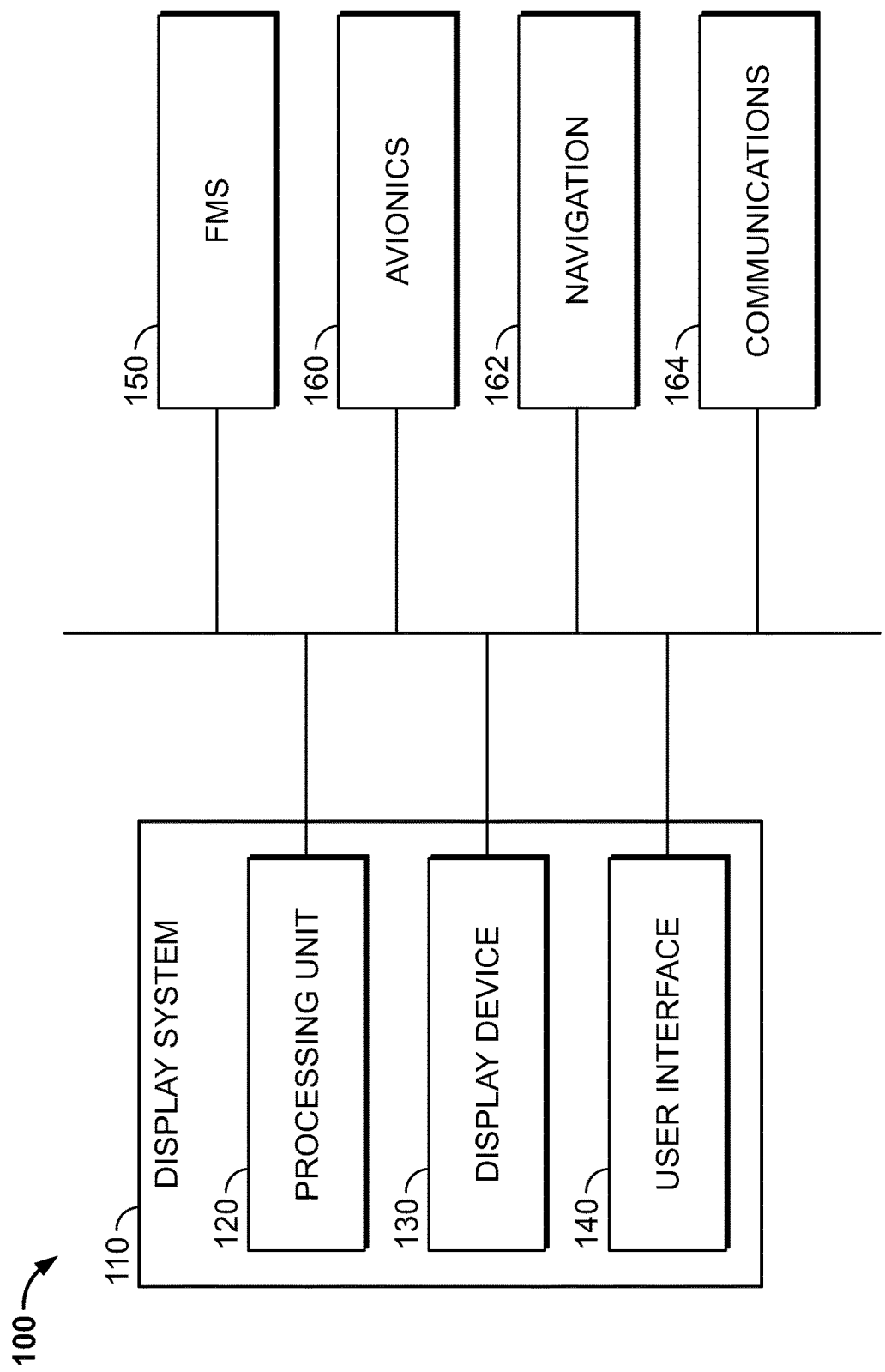
FIG. 1 is a block diagram of a system for an aircraft in an exemplary embodiment.

Embodiments of the subject matter described herein generally relate to systems and methods for resolving a user input on a touchscreen, touch-panel, or other tactile input device to a particular individual selectable element displayed thereon based on temporal characteristics of the user input. In this regard, the displayed element or display functionality intended to be selected by the user is intelligently determined based on the temporal duration of the tactile user input in concert with the spatial relationship of the tactile user input with respect to the displayed elements. Additionally, when multiple displayed elements are identified for potential selection based on the temporal and spatial characteristics of the tactile user input, a prioritization scheme may be applied to automatically select or otherwise identify, from among the plurality of displayed elements identified, a selected one of the displayed elements in accordance with the prioritization scheme. In exemplary implementations, the prioritization scheme is influenced by the current operational context to select or otherwise identify the displayed element most likely to be operationally relevant to the current context from among the subset of displayed elements identified based on the temporal duration and spatial location of the tactile user input. Thus, a user may achieve or otherwise effectuate the desired selection by controlling or modulating the temporal characteristics of the tactile user input (in concert with the location or spatial characteristics of the tactile user input) without having to pan, zoom, or otherwise manipulate the display to enable selection when multiple selectable elements are concurrently displayed in close proximity (e.g., when multiple selectable elements are encompassed by the area of the fingertip or other input element utilized to provide the tactile user input).

Although the subject matter is described herein primarily in an aviation context and with reference to a flight plan, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to use with aircraft or in an aviation environment. As used herein, a flight plan should be understood as a sequence of navigational reference points or waypoints that define a flight path or route for an aircraft. Depending on the particular flight plan and type of air navigation, the waypoints may comprise navigational aids, such as VHF omni-directional ranges (VORs), distance measuring equipment (DMEs), tactical air navigation aids (TACANs), and combinations thereof (e.g., VORTACs), landing and/or departure locations (e.g., airports, airstrips, runways, landing strips, heliports, helipads, and the like), points of interest or other features on the ground, as well as position fixes (e.g., initial approach fixes (IAFs) and/or final approach fixes (FAFs)) and other navigational reference points used in area navigation (RNAV). For example, a flight plan may include an initial or beginning reference point (e.g., a departure or takeoff location), a final navigational reference point (e.g., an arrival or landing location), and one or more intermediate navigational reference points (e.g., waypoints, positional fixes, and the like) that define the desired path or route for the aircraft from the initial navigational reference point to the final navigational reference point. That said, it should be noted that the term waypoint should be considered interchangeable with other terms such as "landmarks," "navigational aids," or the like, as specific terminology may vary between the aviation, maritime and automotive applications.

FIG. 1 is a schematic representation of an aircraft system 100 with a visual display system 110 coupled to a flight management system (FMS) 150 and one or more data sources 160, 162, 164. The components and subcomponents of system 100 may be coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft.

The visual display system 110 includes a processing unit 120, a display device 130, and a user interface 140. Generally, the visual display system 110 displays information from the FMS 150 via the display device 130 and enables interaction between a user (e.g., a pilot or other type of operator) and the FMS 150, as described in greater detail below. Additional information about the operation will be provided below after a brief introduction of each component.

In one or more embodiments, the processing unit 120 is a computer processor associated with flight planning and management functions, particularly the display and navigation of a list of waypoints, such as in a flight plan. In one exemplary embodiment, the processing unit 120 functions to at least receive and/or retrieve aircraft flight management information (e.g., from the FMS 150 and data sources 160, 162, 164). The processing unit 120 may also generate display commands for displaying the flight management information. In this regard, the processing unit 120 may function as a graphics display generator to generate display commands based on algorithms or other machine instructions stored in the processing unit 120 or in separate memory components. The processing unit 120 may then send the generated display commands to display device 130 for presentation to the user. The processing unit 120 may additionally receive and generate display commands based on inputs via the user interface 140.

Depending on the embodiment, the processing unit 120 may be implemented or realized with a general-purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 120 includes processing logic that may be configured to carry out the functions, techniques, and processing tasks or methods associated with operation of the system 100. The processing unit 120 may further include any suitable type of memory or data storage, such as for example, RAM, ROM, EEPROM, flash memory, optical or magnetic storage devices, or any other medium that can be used to store and access desired information.

The display device 130 is coupled to the processing unit 120 for rendering information to the user based on display commands. In one exemplary embodiment, the display device 130 may be a multifunction monitor, unit, or any display suitable for displaying various symbols and information, such as a multifunction control display unit (MCDU), cockpit display device (CDU), primary flight display (PFD), and/or navigation display. Any suitable type of display medium capable of visually presenting multicolored or monochrome flight information for a pilot or other flight crew member can be provided, such as, for example, various types of CRT displays, LCDs, OLED displays, plasma displays, projection displays, HDDs, HUDs, and the like.

In exemplary embodiments, the user interface 140 is coupled to the processing unit 120 to allow a user to interact with the display device 130 and/or other elements of the system 100. The user interface may be realized as a keypad, touchpad, keyboard, mouse, touch panel, joystick, knob, line select key or another suitable device adapted to receive input from a user. In further embodiments, the user interface 140 is realized as audio input and output devices, such as a speaker, microphone, audio transducer, audio sensor, or the like. In some embodiments, the user interface may be incorporated into the display device 130. For example, in one or more embodiments, the display device 130 and user interface 140 are integrated as an interactive MCDU with a display screen and a keyboard, touch-screen and/or other mechanisms for function, display, and/or cursor control.

The FMS 150 is coupled to the display system 110 and one or more data sources 160, 162, 164 and generally functions to support navigation, flight planning, and other aircraft control functions, as well as provides real-time data and/or information regarding the operational status of the aircraft. The FMS 150 may include or otherwise access one or more of the following: a weather system, an air traffic management system, a radar system, a traffic avoidance system, an autopilot system, a flight control system, crew alerting systems, electronic checklist systems, an electronic flight bag, and/or other suitable avionics systems. In particular, the FMS 150 may store and/or generate a flight plan for traveling between a current or initial destination and a final destination.

The data sources 160, 162, 164 can include any suitable type of data source that may be used to construct or modify the flight plan, such as an avionics database 160, a navigation system 162, and a communications system 164, as examples. The avionics database 160 may store aeronautical information data, including, for example, flight plan data, data related to airways, navigational aids, navigational data, obstructions, taxi registration, Special Use Airspace, political boundaries, COM frequencies, approach information, geographical information and the like. The navigation system 162 is configured to provide real-time navigational data and/or information regarding operation of the aircraft. The communications system 164 is suitably configured to support communications between the aircraft and another aircraft or ground location (e.g., air traffic control) via a radio system or another suitable data link system.

As introduced above, the display system 110 particularly functions to display a flight plan, including as examples, a selected or otherwise designated flight plan for subsequent execution, a flight plan selected for review, and/or a flight plan currently being executed by the aircraft. In some embodiments, the FMS 150 may store predefined flight plans, while in further embodiments, the flight plan may be uplinked via the communications system 164 and/or manually entered or created by the user via the user interface 140. In one or more exemplary embodiments, the display system 110 renders or otherwise provides a lateral map or other navigational map that includes a graphical representation of at least a portion of the route defined by the flight plan. In addition to the displayed flight plan flight path, the lateral map may also include graphical representations of terrain, meteorological conditions, navigational reference points (e.g., waypoints, navigational aids, distance measuring equipment (DMEs), very high frequency omnidirectional radio ranges (VORs), and the like), designated special use airspaces or airspace restrictions, air traffic, obstacles, and/or the like. In this regard, the lateral map may include different layers of graphical elements that are based on or otherwise derived from different data sources, which, in some embodiment, may be selectively added or removed from the display. Additionally, graphical elements in different data layers may be collocated or otherwise correspond to overlapping geographic locations or regions, such that different types of graphical elements may overlie one another on the display.

As described above, in exemplary embodiments, the flight plan includes a sequence of navigational reference points or waypoints that define a flight path or route to be flown by the aircraft. In practice, waypoints may have various types of characteristics, attributes, or properties associated therewith. These characteristics may be a function of the waypoint itself or a function of the placement of the waypoint within the flight plan. For example, a waypoint may be associated with a particular type of aircraft procedure (e.g., a turn or holding procedure) or be associated with a designated constraint, such as noise, altitude, and/or speed constraints. As further examples, a waypoint may be associated with a specific segment of the flight plan (e.g., departure, en route, approach, missed approach, and/or alternate flight plan). One or more of the characteristics, attributes and/or properties associated with a given waypoint may be presented in association with that waypoint when that waypoint is current selected.

Generally, the FMS 150 may associate different characteristics to waypoints of a flight plan based on various factors. For example, the FMS 150 may determine some waypoint characteristics based on information from the navigation system 162 and/or avionics database 160 (e.g., identifying a waypoint as a runway or compulsory reporting point; identifying stored defined patterns associated with the waypoint, such as procedure turns, published holding patterns, etc.) or based on flight plan modifications (e.g., the crew and/or operator may insert a holding pattern at a specific waypoint as instructed by ground station). In practice, the FMS 150 may evaluate and divide the entire flight plan to map the waypoints to specific flight phases (or segments), e.g., departure, en-route, arrival procedures, etc. For example, the FMS 150 can assign waypoints from origin to top of climb as departure waypoints; from top of climb to top of descent including any step climbs as en-route waypoints; and from top of descent to destination as arrival waypoints. In this manner, the FMS 150 may identify different logical groupings of waypoints according to logically distinct operational segments of the flight plan.

Figure 2:
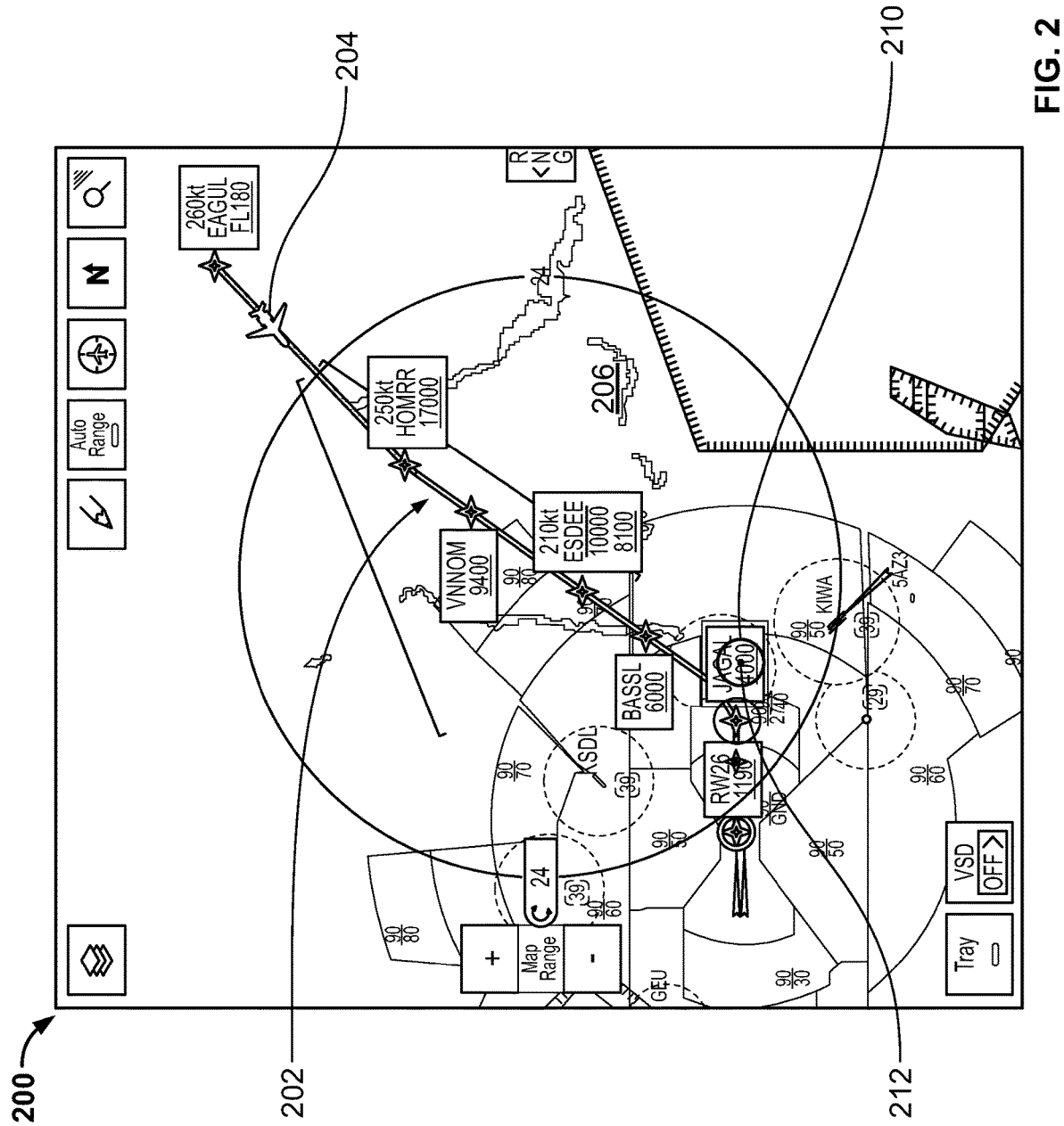
FIG. 2 depicts an exemplary navigational map graphical user interface (GUI) display suitable for presentation on a display device onboard an aircraft in accordance with one or more exemplary embodiments.

FIG. 2 depicts an exemplary navigational map graphical user interface (GUI) display 200 that may be displayed, rendered, or otherwise presented by the display system 110 and/or processing unit 120 on a display device 130 onboard an aircraft. The navigational map 200 includes a graphical representation of a portion of route 202 defined by a flight plan for the aircraft and a graphical representation 204 of the aircraft overlaid or rendered on top of a background 206. Depending on the implementation, the background 206 may include graphical representations of the terrain, topology, navigational reference points, airspace designations and/or restrictions, or other suitable items or points of interest corresponding to the currently displayed area of the navigational map 206, based upon corresponding data which may be maintained in a terrain database, a navigational database, a geopolitical database, or another suitable database. For example, the display system 110 and/or processing unit 120 may render a graphical representation of navigational aids (e.g., VORs, VORTACs, DMEs, and the like) and airports within the currently displayed geographic area of the navigational map 200 overlying the background 206. Some embodiments of the navigational map 200 may also include graphical representations of airspace designations and/or airspace restrictions, cities, towns, roads, railroads, and other geo-political information. Although FIG. 2 depicts a top view (e.g., from above the aircraft 204) of the navigational map 200 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 200 corresponds to the geographic area that is currently displayed in the navigational map 200, that is, the field of view about the center location of the navigational map 200. As used herein, the center location of the navigational map 200 comprises a reference location for the middle or geometric center of the navigational map 200 which corresponds to a geographic location.

In one or more exemplary embodiments, the navigational map 200 is associated with the movement of the aircraft, and the aircraft symbology 204 and/or background 206 refreshes or otherwise updates as the aircraft travels, such that the graphical representation of the aircraft 204 is positioned over the terrain background 206 in a manner that accurately reflects the current (e.g., instantaneous or substantially real-time) real-world positioning of the aircraft relative to the earth. In some embodiments, the aircraft symbology 204 is shown as traveling across the navigational map 200 (e.g., by updating the location of the aircraft symbology 204 with respect to the background 206), while in other embodiments, the aircraft symbology 204 may be located at a fixed position on the navigational map 200 (e.g., by updating the background 206 with respect to the aircraft symbology 204 such that the map 200 is maintained centered on and/or aligned with the aircraft symbology 204). Additionally, depending on the embodiment, the navigational map 200 may be oriented in a cardinal direction (e.g., oriented north-up so that moving upward on the map 200 corresponds to traveling northward), or alternatively, the orientation of the navigational map 200 may be track-up or heading-up (i.e., aligned such that the aircraft symbology 204 is always traveling in an upward direction and the background 206 adjusted accordingly).

Figure 3:
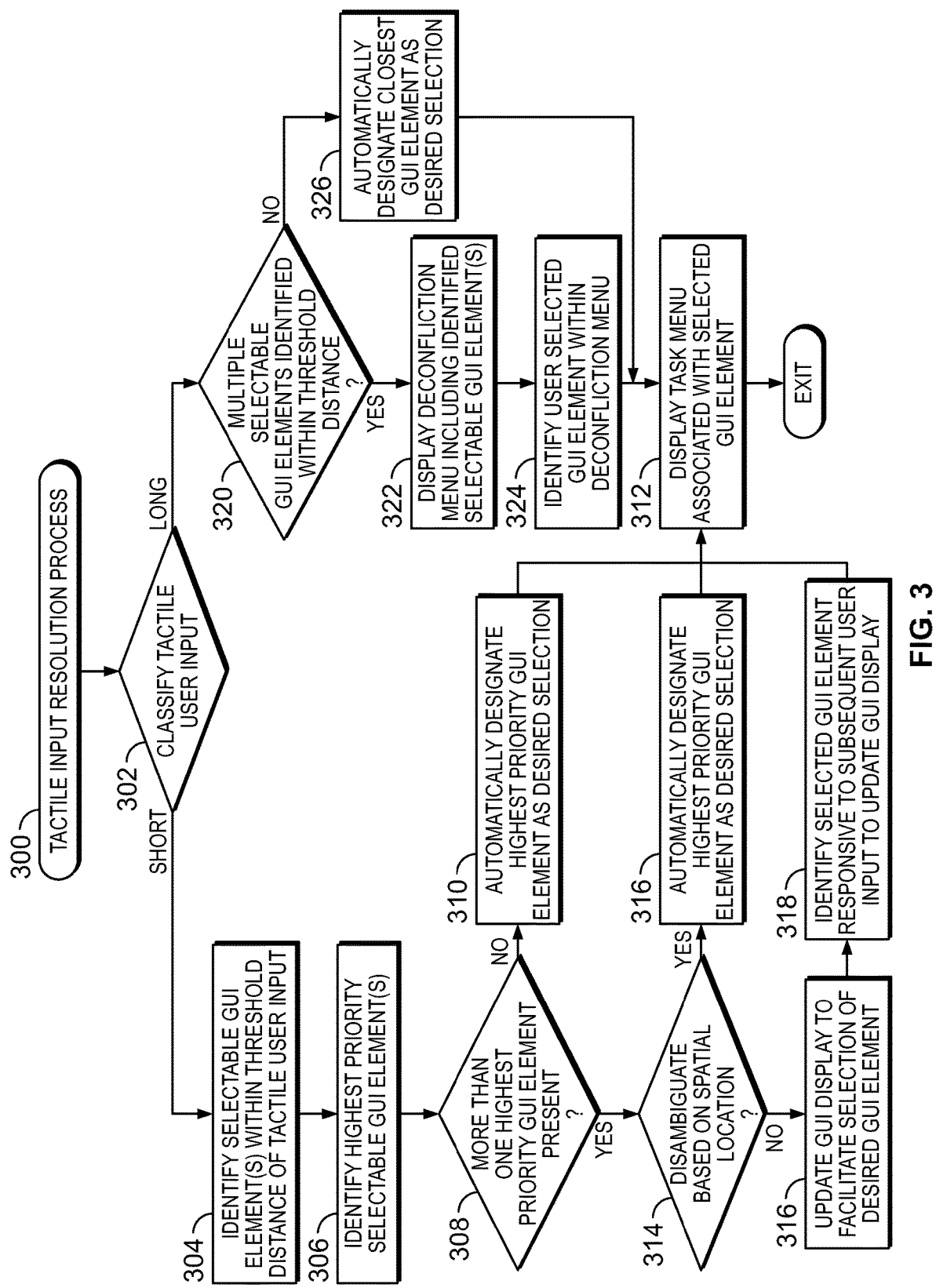
FIG. 3 depicts an exemplary tactile input resolution process suitable for implementation by the system of FIG. 1 in one or more exemplary embodiments.

FIG. 3 depicts an exemplary embodiment of a tactile input resolution process 300 suitable for implementation by an aircraft system or display system to resolve or otherwise map a tactile user input to a particular graphical element displayed on a display device, or alternatively, a particular functionality related to the display. The various tasks performed in connection with the illustrated process may be implemented using hardware, firmware, software executed by processing circuitry, or any combination thereof. In practice, portions of the tactile input resolution process 300 may be performed by different elements of the aircraft system 100 and/or the display system 110. It should be appreciated that the tactile input resolution process 300 may include any number of additional or alternative tasks, the tasks need not be performed in the illustrated order and/or the tasks may be performed concurrently, and/or the tactile input resolution process 300 may be incorporated into a more comprehensive procedure or process having additional functionality not described in detail herein. Moreover, one or more of the tasks shown and described in the context of FIG. 3 could be omitted from a practical embodiment of the tactile input resolution process 300 as long as the intended overall functionality remains intact.

In exemplary embodiments, the tactile input resolution process 300 continually monitors or otherwise analyzes the output of a touch panel, touchscreen, or other tactile user input device to detect or otherwise identify the presence of a tactile user input. For example, a tactile user interface device 140 may include an array of sensors arranged adjacent or proximate to a display 130 that are configured to detect contact to a surface of the display 130 and generate corresponding output signals indicative of coordinate locations on the display 130 that were touched or otherwise contacted by a user. Tactile user input may be received or detected using any number of different technologies (e.g., resistive, capacitive, magnetic, and/or the like) and is not germane to this disclosure. In response to receiving, detecting, or otherwise identifying an output from the tactile user interface device 140 indicative of a tactile user input with respect to the display 130, the processing unit 120 may initiate or otherwise perform the tactile input resolution process 300 of FIG. 3 to map or otherwise resolve the tactile user input to a particular selection.

The tactile input resolution process 300 analyzes the temporal characteristics of the tactile user input to classify or otherwise categorize the tactile user input based on the temporal characteristics. In this regard, the processing unit 120 may calculate or otherwise determine a duration of the tactile user input by implementing a timer or similar feature to measure the period of time over which the tactile user interface device 140 provides a substantially constant output indicative of sustained physical contact or proximity for an input selection gesture. In other embodiments, where the tactile user input is realized using a swipe or other type of gesture to select or otherwise indicate a region on the display where the spatial location of the tactile user input varies with respect to time, the duration of the tactile user input may be measured and utilized to calculate other temporal metrics or characteristics associated with the tactile user input gesture, such as, for example, a velocity of the input gesture, an acceleration of the input gesture, and/or the like. Based on the temporal characteristic(s) associated with the tactile user input, the tactile input resolution process 300 classifies the tactile user input into a particular category of user input, and then based on that temporal classification, determines which selectable graphical element on the GUI display the user intended to select in accordance with the temporal classification. In this manner, the temporal classification is utilized to disambiguate the intent of the tactile user input gesture.

In the illustrated embodiment of FIG. 3, the tactile input resolution process 300 classifies the tactile user input into one of a short duration tactile user input category (or short touch) and a long duration tactile user input category (or long touch) (task 302). For example, a tactile user input that results in output signals from the tactile user interface device 140 indicative of physical contact or proximity that persists in substantially the same location (e.g., without moving more than 0.05 inches) for a duration of time longer than a classification threshold time period (e.g., greater than or equal to one second) may be classified as a long touch, while other tactile user inputs having associated durations that are less than the classification threshold duration of time (e.g., less than one second) may be classified as a short touch.

In response to classifying the tactile user input as a short touch (or into the short duration tactile user input category), the tactile input resolution process 300 continues by analyzing the coordinate location or other spatial characteristics of the tactile user input with respect to the displayed content to identify or otherwise determine how many selectable graphical elements or objects are displayed within a threshold distance of the tactile user input (task 304). In this regard, the processing unit 120 utilizes the coordinate locations for the touch location on the display 130 that are output by the tactile user interface device 140 to identify or otherwise determine what selectable content is displayed on the display 130 at or within a threshold on-screen distance of the touch location on the display 130. For example, the processing unit 120 may analyze the different data layers of a navigational map GUI display 200 presented on the display 130 to identify any selectable graphical elements presented within a threshold distance of the touch location within the respective data layer. In this manner, the processing unit 120 may identify any waypoints or other navigational reference points depicted within a threshold distance of the touch location, any airports or landing locations depicted within a threshold distance of the touch location, any airspaces that overlap or encompass the touch location, any air traffic within a threshold distance of the touch location, and/or the like. In this regard, in some embodiments, the processing unit 120 may exclude certain data layers from analysis or consideration (e.g., the terrain layer).

In one or more exemplary embodiments, the threshold distance is chosen to encompass or otherwise define an area on the display 130 that corresponds to the area of a human fingertip about the location of the tactile user input (e.g., coordinate touch location 212). For example, the threshold distance may be chosen to define a circumference, a circular area, an elliptical area or another suitable geometrically shaped region about the touch location that corresponds to an average contact area for a human fingertip when pressed against the tactile user interface device 140 and/or the display 130. In embodiments where the tactile user interface device 140 outputs signals indicative of multiple coordinate locations being contacted concurrently, the tactile input resolution process 300 may be configured to calculate or otherwise determine a geometric center coordinate location of the tactile user input or another representative coordinate location for the tactile user input about which the threshold distance is utilized to identify potential on-screen GUI element encompassed by (or intended to be encompassed by) the tactile user input. In this regard, the threshold distance is utilized by the tactile input resolution process 300 to filter or otherwise exclude selectable elements on the display 130 that are not within the threshold distance of the tactile user input from further consideration as being unlikely to have been intended to be selected by the user.

In one or more embodiments, the threshold distance dynamically increases with respect to the duration of the long touch, thereby allowing the pilot or other user to progressively and/or incrementally increase the area associated with the user input (and the number of selectable graphical elements encompassed therein) by maintaining the long touch user input for a longer duration of time. For example, in response to detecting a tactile user input that persists for a duration of time longer than the classification threshold time period, the tactile input resolution process 300 may generate or otherwise provide a graphical indication of the selected area corresponding to on-screen locations within the threshold distance of the location of the tactile user input, for example, by rendering a circle or ring corresponding to the tactile user input that has a center location corresponding to the center location of the tactile user input and a radius corresponding to the threshold distance. Thereafter, as the duration of the long touch user input increases, the threshold distance and the radius of the displayed circle corresponding to the tactile user input may increase to encompass a larger area and additional selectable graphical elements on the display until the user ceases the long touch user input. For example, once the tactile user input is maintained for at least one second, a circle or ring with a radius equal to the initial threshold distance may be displayed encompassing an initial area around the tactile user input. Thereafter, once the long touch tactile user input is maintained for another 500 milliseconds (e.g., at least 1.5 seconds cumulatively), the threshold distance and corresponding radius of the displayed circle or ring may increase by some amount or percentage (e.g., 25%) to encompass a greater area around the tactile user input, with the threshold distance and corresponding radius further increasing by the same amount or percentage to encompass a greater area around the tactile user input once the long touch tactile user input is maintained for another 500 milliseconds (e.g., at least 2 seconds cumulatively), and so on. In this regard, it should be appreciated that there are numerous different manners in which the threshold distance and the corresponding encompassed or selected area associated with the long touch tactile user input can dynamically increase with respect to the duration of the long touch tactile user input, and the subject matter described herein is not limited to any particular implementation.

Still referring to FIG. 3, when there are multiple selectable graphical elements displayed within a threshold distance of the touch location of a short touch, the tactile input resolution process 300 automatically selects or otherwise identifies, for use as the selected graphical element, a highest priority graphical element from among the plurality of selectable graphical elements using a prioritization scheme or prioritization logic (task 306). In some embodiments, the prioritization scheme or prioritization logic may be static; however, in other embodiments, the prioritization may be context-sensitive and dynamically vary depending on the current operating context of the aircraft (e.g., vary based on the current flight phase, the current location within the flight plan, the current aircraft altitude, the current aircraft configuration, and/or the like). In such embodiments, the tactile input resolution process 300 identifies or otherwise obtains current status information characterizing the current operating state of the aircraft and dynamically determines the respective priority to be associated with each of the respective selectable graphical elements under consideration.

In one or more embodiments, the current status information utilized by the tactile input resolution process 300 to identify the highest priority selectable graphical element(s) includes the instantaneous, real-time or most recent available values for one or more parameters that quantify the current operation of the aircraft. For example, tactile input resolution process 300 may obtain (e.g., from the FMS, navigation system and/or other avionic systems) one or more of the following: the current location of the aircraft, the current altitude (or above ground level) of the aircraft, the current heading (or bearing) of the aircraft, the current amount of fuel remaining onboard the aircraft, the current engine status, the current aircraft configuration (e.g., the current flap configuration, the current landing gear configuration, and/or the like). Thus, the current values for the different operational state parameters define the current operating state of the aircraft, which, in turn, are utilized to assign different priority levels or values to the different selectable elements in accordance with the prioritization scheme or logic. For example, a waypoint that is closer to the current aircraft location could be prioritized for selection ahead of other displayed graphical elements that are further from the current aircraft location. As another example, displayed graphical elements associated with a particular type of aircraft procedure (e.g., an approach procedure, a departure procedure, and/or the like) could be assigned a higher priority when the current flight phase matches or otherwise corresponds to that particular aircraft procedure (e.g., by prioritizing graphical elements related to an approach procedure for an airport when the aircraft is in an approach or descent flight phase en route to that airport), or conversely, be assigned a lower priority (or deprioritized) when the current flight phase is incompatible or inconsistent with that particular aircraft procedure (e.g., by deprioritizing graphical elements related to an approach procedure for an airport when the aircraft is in a departure or climbing flight phase departing from that airport).

In one or more embodiments, the priority is determined based on the operational significance or criticality of the particular graphical element. For example, a waypoint that is a part of the current flight plan would be prioritized for selection ahead of a nearby waypoint that is not part of the current flight plan or other displayed graphical elements (e.g., airspace boundaries, obstacles, or the like) that are less operationally-significant or relevant to the current flight plan. As another example, a runway or procedure assigned to the aircraft for takeoff and/or landing is prioritized for selection ahead of another runway or procedure within the threshold on-screen distance of the touch location that is not assigned to the aircraft or otherwise expected to be flown by the aircraft. As another example, the priority is determined based on the frequency of use of the particular graphical element or the particular type of graphical element. For example, if waypoints are selected by pilots more frequently than airspace boundaries or other obstacles, any displayed waypoint(s) identified within the threshold distance of the tactile user input may be prioritized ahead of any airspace boundaries or other obstacle. It should be noted that there are numerous different potential prioritization schemes, and the subject matter described herein is not limited to any particular prioritization scheme or logic used to identify the highest priority graphical element that is most probable or likely to have been intended to be selected.

Still referring to FIG. 3, the tactile input resolution process 300 determines whether more than one highest priority selectable graphical element exists within the threshold distance of the tactile user input (task 308). When the tactile input resolution process 300 identifies an individual selectable graphical element having the highest priority, the tactile input resolution process 300 designates the highest priority selectable graphical element as the user selection that was most likely desired by the tactile user input and automatically responds to the tactile user input to reflect user selection of the highest priority graphical element by generating or otherwise displaying a menu associated with the identified graphical element (tasks 310, 312). It should be appreciated that by virtue of the prioritization and tactile input resolution process 300, the coordinate location associated with the tactile user input may be different from the coordinate location associated with the highest priority graphical element identified as selected, and/or the coordinate location associated with the highest priority graphical element identified as selected may be further from the coordinate location associated with the tactile user input than the coordinate location(s) of other graphical element(s) on the display. In other words, the graphical element identified as selected by a short touch tactile user input pursuant to the tactile input resolution process 300 may not be the closest selectable graphical element to the location of the tactile user input, and the graphical element identified as selected may be different from another graphical element that might otherwise be identified for the same short touch tactile user input in the absence of the tactile input resolution process 300 (e.g., based on proximity).

Figure 4:
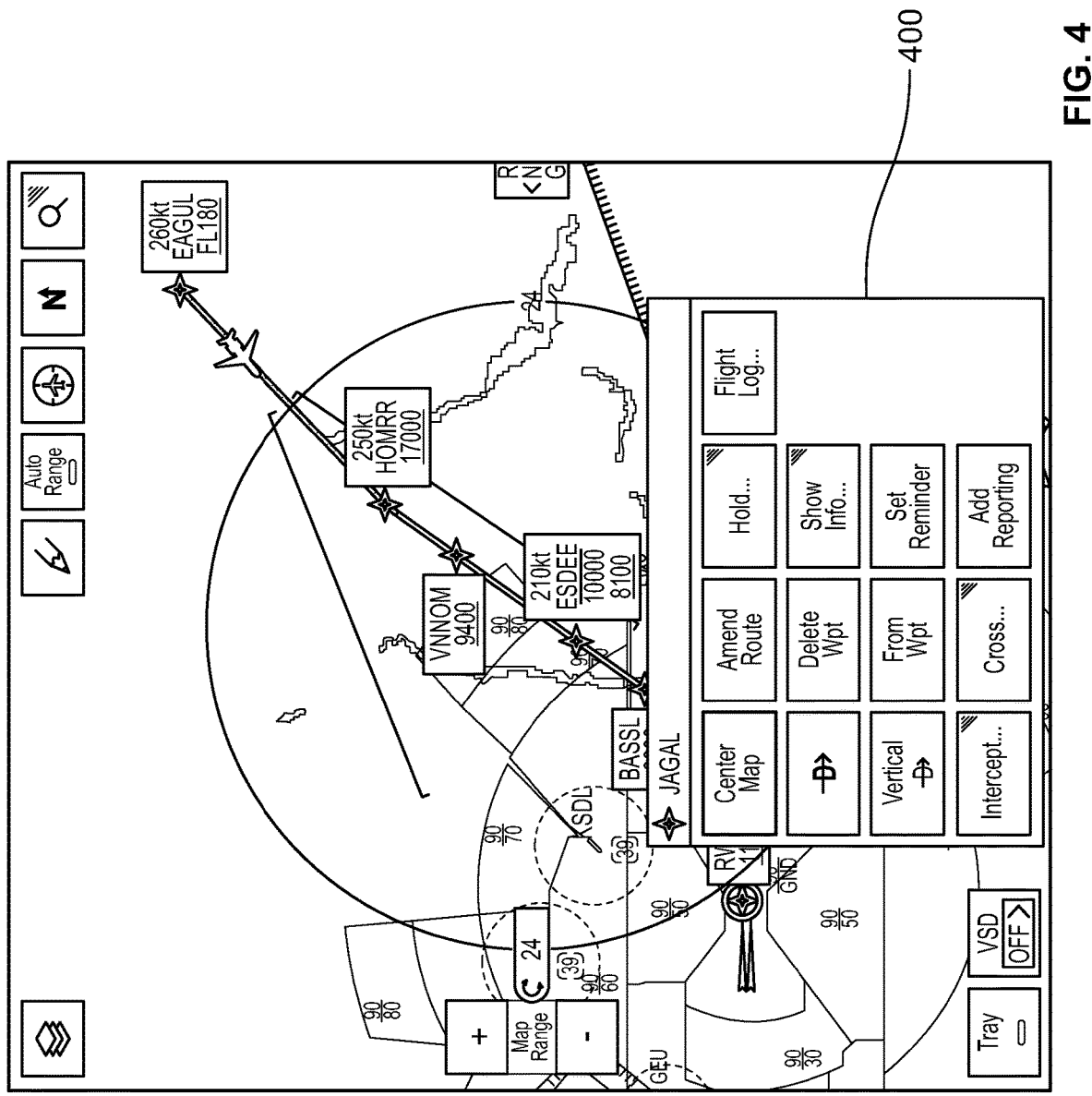
FIG. 4 depicts an exemplary updated navigational map GUI display suitable for presentation on a display device onboard an aircraft in connection with the tactile input resolution process of FIG. 3 in response to a short touch tactile user input to the navigational map GUI display of FIG. 2 in accordance with one or more exemplary embodiments.

FIG. 4 depicts a waypoint task menu graphical user interface (GUI) display window 400 that may be generated or otherwise displayed on or overlying the navigational map 200 in response to identifying selection of the JAGAL waypoint as the highest priority selectable graphical element within the threshold distance of a short touch tactile user input. Referring to FIG. 4 with reference to FIG. 2, in response to a tactile user input 210 (represented by a circle corresponding to a fingertip or other circular user input element), the tactile input resolution process 300 identifies the various graphical elements that are displayed on the map 200 within a threshold distance of the coordinate touch location 212 corresponding to the center of the tactile user input 210 (e.g., task 304), including, for example, the label associated with the JAGAL waypoint, the KFFZ airport underlying the JAGAL waypoint label, and the airspace associated with the KFFZ airport. When the tactile user input 210 has a short duration (e.g., task 302), the tactile input resolution process 300 automatically identifies the JAGAL waypoint label as the probable graphical element to be selected based on the JAGAL waypoint being part of the current flight plan 202, and therefore, having greater operational significance and higher priority than the KFFZ airport-related graphical elements (e.g., task 306). In response to identifying the JAGAL waypoint as the intended selection for the received tactile user input (e.g., tasks 308, 310), the processing unit 120 generates, displays or otherwise provides a waypoint task menu 400 associated with the JAGAL waypoint to automatically update the displayed state of the navigational map 200 from the state depicted in FIG. 2 to the updated state depicted in FIG. 4 (e.g., task 312). Thereafter, the user may manipulate the waypoint task menu 400 to review, analyze, modify or configure the constraints, characteristics, attributes or other properties associated with the JAGAL waypoint.

Referring again to FIG. 3, it should be appreciated that when a single selectable graphical element is identified within the threshold on-screen distance of a short touch tactile user input, by default that selectable graphical element is the highest priority selectable graphical element within the threshold distance of the tactile user input, and therefore, the tactile input resolution process 300 automatically designates that selectable graphical element as selected by the user, automatically generates, displays, or otherwise provides a menu associated with selection of that identified graphical element (e.g., tasks 306, 308, 310, 312). On the other hand, if no selectable graphical elements are identified within the threshold on-screen distance of a short touch, the tactile input resolution process 300 takes no action responsive to the tactile user input. In this manner, the tactile input resolution process 300 reduces the likelihood of inadvertent contact to the display 130 from undesirably altering the displayed content. For example, transient contact associated with a pilot attempting to pan the map by dragging may be ignored rather than interrupting or interfering with the pan by responding and displaying undesired content.

Still referring to FIG. 3, in the illustrated embodiment, when the tactile input resolution process 300 identifies multiple selectable graphical elements having the highest priority, the tactile input resolution process 300 analyzes the respective coordinate locations associated with the respective highest priority selectable graphical elements to disambiguate and resolve the tactile user input to the nearest one of the highest priority selectable graphical elements (task 314). In this regard, for each higher priority selectable graphical element, the tactile input resolution process 300 may calculate or otherwise determine a respective distance between the center or reference coordinate location on the display associated with the respective selectable graphical element and the center or reference coordinate location of the tactile user input. The tactile input resolution process 300 may then analyze the distances between respective ones of the highest priority selectable graphical elements and the tactile user input to disambiguate the probable or most likely intended selection that has the smallest distance difference and is closest to the tactile user input. When the tactile input resolution process 300 is able to identify a closest one of the highest priority selectable graphical elements, the tactile input resolution process 300 designates the closest highest priority selectable graphical element as the user selection that was most likely desired by the tactile user input (task 316). Thereafter, the tactile input resolution process 300 automatically responds to the tactile user input in accordance with selection of the closest highest priority graphical element by generating or otherwise displaying a menu associated with the identified graphical element in a similar manner as described above in the context of FIG. 4 (e.g., task 312).

When the tactile input resolution process 300 is unable to disambiguate the highest priority selectable graphical elements based on location, the tactile input resolution process 300 automatically updates or otherwise modifies the graphical user interface display to facilitate user selection from among the highest priority selectable graphical elements (task 316). For example, in situations where the highest priority selectable graphical elements are overlapping or the distance differences between the respective ones of the highest priority selectable graphical elements and the tactile user input are substantially equal to one another (e.g., within less than a disambiguation threshold distance of one another), the tactile input resolution process 300 renders or otherwise provides a GUI display that allows the user to select the desired selectable graphical element from among the highest priority selectable graphical elements. In one or more embodiments, the tactile input resolution process 300 generates, renders or otherwise provides a deconfliction menu GUI display window that includes only the limited subset of the highest priority selectable graphical elements within the threshold distance of the tactile user input (e.g., by filtering or otherwise excluding lower priority selectable graphical elements within the threshold distance of the tactile user input from presentation within the deconfliction menu). In this regard, the deconfliction menu GUI display window includes a list or menu of buttons or similar selectable GUI elements that correspond to respective ones of the limited subset of the highest priority selectable graphical elements, in a similar manner as described below in the context of FIG. 5. In other exemplary embodiments, the tactile input resolution process 300 automatically generates or otherwise renders an updated GUI display that includes an enhancement or zoomed in graphical representation of the selected portion of content displayed on the display device within the threshold distance of the tactile user input. In this regard, the enhancement of the selected portion of content displayed on the display device includes or otherwise encompasses the highest priority selectable graphical elements that could not be disambiguated and results in an updated graphical representation or depiction of the highest priority selectable graphical elements on the display where the separation distance between those highest priority selectable graphical elements is greater than the initial or previous state of the GUI display (e.g., by zooming in on the location associated with the tactile user input).

After updating or otherwise enhancing the GUI display, the tactile input resolution process 300 identifies or otherwise determines the selected graphical element based on one or more subsequent user inputs with respect to the updated GUI display (task 318). In this regard, in response to a second tactile user input with respect to the enhancement of the selected portion of content, the tactile input resolution process 300 may be repeated with respect to one or more subsequent tactile user inputs received on the updated GUI display(s) until a subsequent tactile user input is resolved to an individual selectable graphical element. Thus, the short touch tactile user input may effectively operate to zoom in on the current GUI display without requiring more complicated gestures by the user (e.g., pinching, double tapping, etc.) until a short touch tactile user input is resolved to a selectable graphical element on the currently depicted GUI display, as described in greater detail below in the context of FIGS. 6-7.

Still referring to FIG. 3, in response to classifying the tactile user input as a long touch (or into the long duration tactile user input category), the tactile input resolution process 300 identifies or otherwise determines what selectable graphical elements or objects are displayed within a threshold distance of the tactile user input (task 320) in a similar manner as described above (e.g., task 304). For a long touch tactile user input, when multiple selectable graphical elements are displayed within a threshold distance of the touch location, the tactile input resolution process 300 automatically generates, displays, or otherwise provides a menu that enables the user to select, from among the identified subset of selectable graphical elements within the threshold on-screen distance of the long touch tactile user input, the particular selectable graphical element that the user would like to select (task 322).

Figure 5:
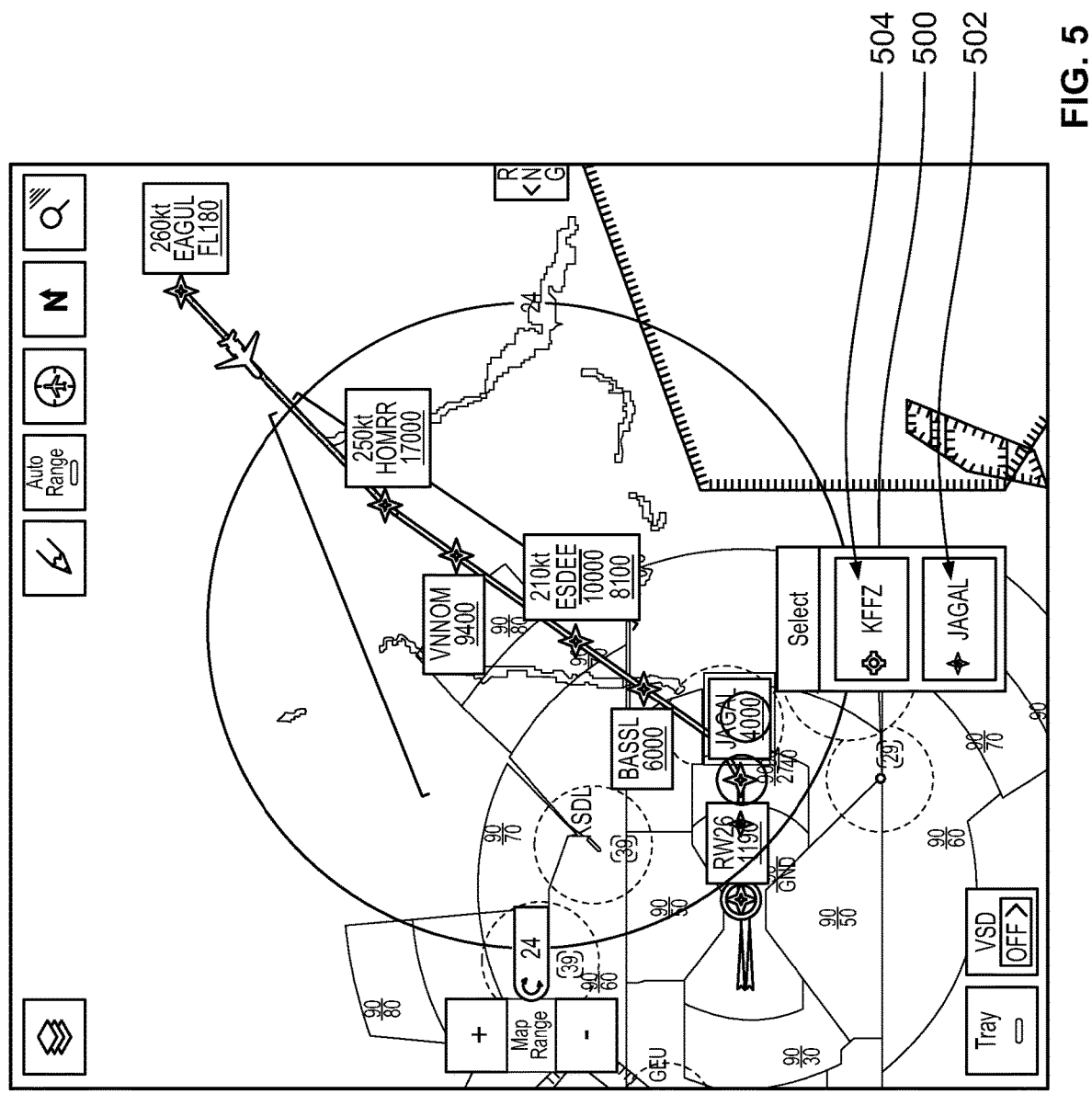
FIG. 5 depicts an exemplary updated navigational map GUI display suitable for presentation on a display device onboard an aircraft in connection with the tactile input resolution process of FIG. 3 in response to a long touch tactile user input to the navigational map GUI display of FIG. 2 in accordance with one or more exemplary embodiments.

For example, referring to FIGS. 2 and 5, when the tactile user input 210 is realized as a long touch, the processing unit 120 automatically generates, displays or otherwise provides a deconfliction menu GUI display window 500 that includes, within the deconfliction menu window 500, selectable GUI elements corresponding to the selectable graphical elements within the threshold distance of the coordinate location 212 for the long touch, i.e., the JAGAL waypoint and the KFFZ airport. In this regard, for a long touch having the same coordinate location 212 as the short touch resulting in the updated display state in FIG. 4, the tactile input resolution process 300 automatically updates the displayed state of the navigational map 200 from the state depicted in FIG. 2 to the updated state depicted in FIG. 5 rather than the state depicted in FIG. 4. It should be appreciated that the list or menu of selectable GUI elements contained within the deconfliction menu GUI display window includes GUI elements only corresponding to those selectable graphical elements that were identified as part of the subset of the selectable graphical elements within the threshold distance of the long touch tactile user input, with other selectable graphical elements greater than the threshold distance from the long touch tactile user input being filtered or otherwise excluded from presentation within the deconfliction menu GUI display window.

Referring again to FIG. 3, the tactile input resolution process 300 continues by identifying or otherwise determining the particular graphical element selected by the user in response to a subsequent user input with respect to the deconfliction menu and automatically responds to selection of the desired graphical element from within the deconfliction menu by generating or otherwise displaying a menu associated with the selected graphical element (tasks 324, 312). For example, referring again to FIG. 5, the user may select the JAGAL waypoint GUI element 502 within the deconfliction menu window 500 to cause the display to be dynamically updated to include the JAGAL waypoint task menu 400 shown in FIG. 4 (e.g., by transitioning from the state depicted in FIG. 5 to the state depicted in FIG. 4). Alternatively, the user may select the KFFZ airport GUI element 504 within the deconfliction menu window 500 to cause the display to be updated to include an airport task menu associated with the KFFZ airport.

Still referring to FIG. 3, when multiple selectable graphical elements are not identified within the threshold on-screen distance of a long touch tactile user input, the tactile input resolution process 300 automatically identifies the displayed graphical element having a displayed coordinate location on-screen that is closest to the long touch coordinate location as the desired user selection (task 326) and then generates, displays, or otherwise provides a task menu associated with that selectable graphical element identified as being closest to the long touch coordinate location (task 312). In this regard, by virtue of the tactile user input being classified as a long touch having a sufficiently long duration, the tactile input resolution process 300 effectively assumes the long touch is not the result of inadvertent contact and that the user likely intended to select the graphical element closest to the coordinate location of the tactile user input. For example, when input precision may be lacking during situations of turbulence, high workload, or when the touchscreen is farther away from the pilot and/or towards the extent of the pilot's reach where the pilot lacks sufficient anchor points to steady his or her hand, a long touch can be utilized to compensate for the lack of precision and intuitively select the desired on-screen graphical element.

It should be noted that although the subject matter is described herein primarily in the context of a lateral navigational map display, the subject matter may be implemented in an equivalent manner for a vertical profile display (or vertical situation display), a synthetic vision display, a primary flight display, or any other GUI display and is not necessarily limited to use with lateral map displays. In some embodiments, in concert with the tactile input resolution process 300, the navigational map display may be configured to automatically hide or remove various overlying menu GUI elements from the navigational map display in the absence of a tactile user input with respect to the navigational map display to facilitate resolving a tactile user input to a particular graphical element displayed on the underlying navigational map display. For example, menu GUI elements to modify the data layers presented on the display, adjust the zoom factor or range of the display, pan the display, and/or the like may be hidden or removed to declutter the navigational map display.

Figure 6:
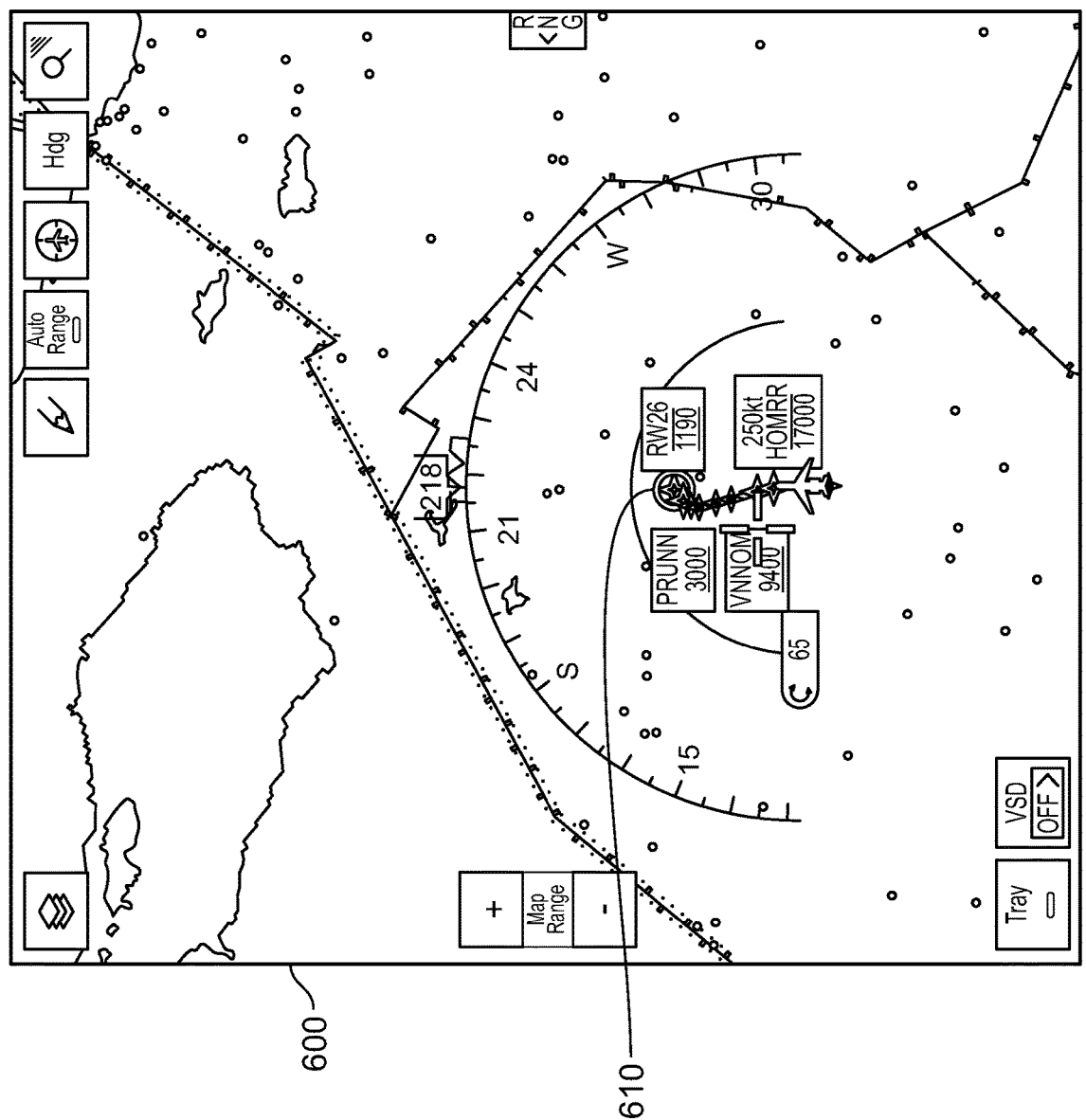
FIGS. 6-7 depict a sequence of navigational map GUI displays for presentation by the system of FIG. 1 in accordance with one or more embodiments.
Figure 7:
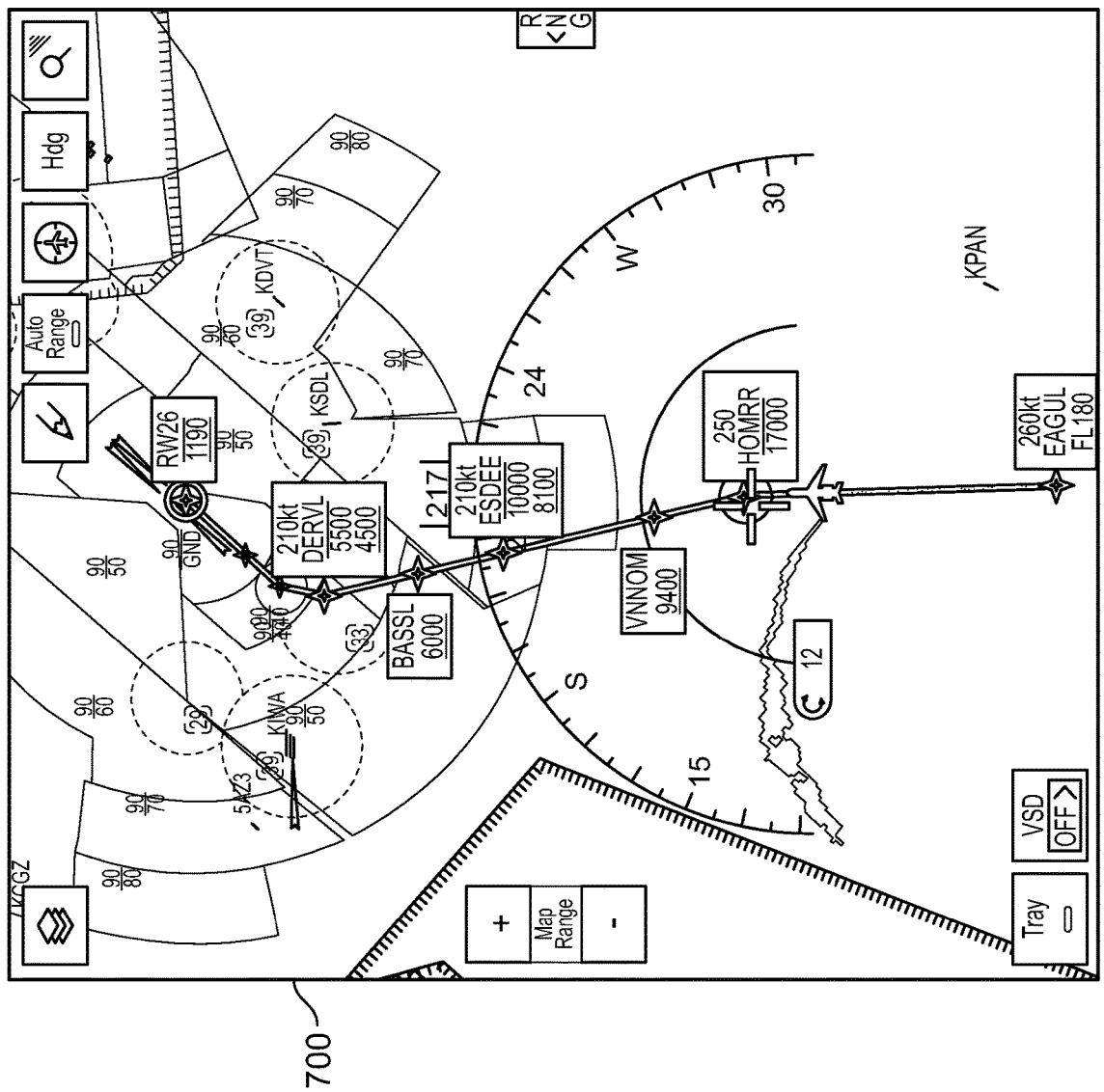

FIGS. 6-7 depict a sequence of GUI displays for the scenario where there are multiple high priority graphical elements at or within a threshold distance of short touch tactile user input, for example, when more than one of the highest priority graphical element are within the same on-screen distance of the tactile user input so that a closest one of the highest priority graphical element cannot readily be identified (e.g., tasks 314, 316, 318). When there is a short touch tactile user input 610 at a particular location on the navigational map GUI display 600 where there is more than one high priority selectable graphical element within the threshold distance of the tactile user input coordinate location such that the short touch cannot be resolved to a single, individual high priority selectable graphical element, the tactile input resolution process 300 may automatically magnify, zoom, or otherwise enhance at least the selected portion of the map where the tactile user input 610 was received to increase the separation distance between selectable graphical elements within the threshold distance of the tactile user input. In this regard, FIG. 7 depicts an enhancement of the navigational map GUI display 600 that results in an updated navigational map GUI display 700 that encompasses the identified selectable graphical elements within the threshold distance of the tactile user input coordinate location rendered with a scale for the updated navigational map GUI display 700 that increases the separation distance between the selectable graphical elements. In one embodiment, the scale for the enhanced navigational map GUI display 700 is chosen to result in separation distances between the identified selectable graphical elements that are greater than the threshold distance utilized to identify the potential subset of selectable graphical elements for a tactile user input, such that a subsequent tactile user input with respect to the enhanced navigational map GUI display 700 will be resolved to only one of the selectable graphical elements. Accordingly, a pilot or other user does not have to manually zoom the map, but rather, can employ a sequence of short touches to zoom or enhance a desired region of the map and select the desired selectable graphical element within that region.

To briefly summarize, the subject matter described herein provides an easier and more predictable way of interacting with a map or other content displayed on a touchscreen display, thereby reducing errors and frustration, which also improves situational awareness and pilot performance by increasing time on task. For example, a navigational map GUI display may often have a high density of graphical elements that may be selected and where the precision required to isolate selection on and individual graphical element is not always achievable with touch—particularly during turbulence, high workload, or when the pilot is seated far away from the touch display without sufficient anchor points to steady the hand. While a cursor control device still works for input selection, pilots will often prefer to be able to select by touch and otherwise become get frustrated when the desired target for selection is not recognized as selected (e.g., when a pilot wishes to add an altitude constraint to a waypoint in the flight plan, and instead of selecting the waypoint, a nearby airspace boundary is selected because it was closer to the center point of the touch). By using the touch duration and potentially other temporal characteristics to classify or otherwise categorize tactile user inputs in concert with contextual prioritization of potential selections for those user inputs, the touchscreen behavior responds in an intuitive and predictable manner that reduces error and frustration, particularly in situations where the requisite spatial precision given the density of the displayed graphical elements may be otherwise unachievable.

For the sake of brevity, conventional techniques related to aircraft procedures, flight planning, graphical user interfaces, graphics and image processing, touch sensing, touchscreens, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of resolving a user selection received via a tactile user interface, the method comprising:
    identifying a plurality of selectable graphical elements within a threshold distance of a tactile user input on a display device;
    classifying the tactile user input into one of a plurality of categories based on a temporal characteristic associated with the tactile user input, resulting in a temporal classification of the tactile user input; and
    determining a selected graphical element of the plurality of selectable graphical elements within the threshold distance of the tactile user input on the display device corresponding to the user selection in accordance with the temporal classification of the tactile user input, wherein determining the selected graphical element comprises:
        when the temporal classification of the tactile user input comprises a first category of the plurality of categories, identifying a priority graphical element of the plurality of selectable graphical elements as the selected graphical element; and
        when the temporal classification of the tactile user input comprises a second category of the plurality of categories, displaying a deconfliction menu comprising the plurality of selectable graphical elements to identify the selected graphical element as a first graphical element of the plurality of selectable graphical elements responsive to subsequent user selection of the first graphical element from the deconfliction menu.

2. The method of claim 1, wherein the first category comprises a short duration tactile user input category and the second category comprises a long duration tactile user input category.

3. The method of claim 1, wherein the plurality of categories includes a short duration tactile user input category and a long duration tactile user input category.

4. The method of claim 3, further comprising measuring a duration of contact associated with the tactile user input, wherein classifying the tactile user input into one of the plurality of categories based on the temporal characteristic comprises classifying the tactile user input into the short duration tactile user input category when the duration of contact is less than a threshold duration associated with the short duration tactile user input category.

5. The method of claim 3, further comprising measuring a duration of contact associated with the tactile user input, wherein classifying the tactile user input into one of the plurality of categories based on the temporal characteristic comprises classifying the tactile user input into the long duration tactile user input category when the duration of contact is greater than a threshold duration associated with the long duration tactile user input category.

6. The method of claim 1, wherein the first category comprises a short duration tactile user input category.

7. The method of claim 1, wherein identifying the highest priority graphical element comprises identifying a highest priority graphical element in a manner that is influenced by a current operational context.

8. The method of claim 7, wherein the current operational context comprises a current flight phase associated with an aircraft having the display device onboard.

9. The method of claim 1, further comprising automatically displaying a menu associated with the highest priority graphical element on the display device.

10. The method of claim 1, the tactile user input being provided on a navigational map graphical user interface (GUI) display on the display device onboard an aircraft, wherein identifying the priority graphical element comprises determining a highest priority graphical element of the plurality of selectable graphical elements on the navigational map GUI display based on a flight plan for the aircraft.

11. The method of claim 1, wherein the second category comprises a long duration tactile user input category.

12. The method of claim 11, wherein:
    identifying the plurality of selectable graphical elements comprises excluding one or more selectable graphical elements displayed on the display device greater than the threshold distance from the tactile user input on the display device to obtain a filtered subset of selectable graphical elements within the threshold distance; and
    the deconfliction menu comprises the filtered subset of selectable graphical elements.

13. The method of claim 1, wherein determining the selected graphical element comprises:
  enhancing a selected portion of content displayed on the display device, resulting in an enhancement of the selected portion of content encompassing the plurality of selectable graphical elements within the threshold distance of the tactile user input on the display device; and
  identifying the selected graphical element in response to a second tactile user input with respect to the enhancement of the selected portion of content.

14. A non-transitory computer-readable medium having computer-executable instructions stored thereon that, when executed by a processing system, cause the processing system to:
  identify a plurality of selectable graphical elements within a threshold distance of a tactile user input on a display device;
  classify the tactile user input into one of a plurality of categories based on a temporal characteristic associated with the tactile user input, resulting in a temporal classification of the tactile user input; and
  determine a selected graphical element of the plurality of selectable graphical elements within the threshold distance of the tactile user input on the display device in accordance with the temporal classification of the tactile user input by:
    identifying a priority graphical element of the plurality of selectable graphical elements as the selected graphical element when the temporal classification of the tactile user input comprises a first category of the plurality of categories; and
    displaying a deconfliction menu comprising the plurality of selectable graphical elements to identify the selected graphical element as a first graphical element of the plurality of selectable graphical elements responsive to subsequent user selection of the first graphical element from the deconfliction menu when the temporal classification of the tactile user input comprises a second category of the plurality of categories.

15. The computer-readable medium of claim 14, wherein the first category comprises a short duration tactile user input category and the second category comprises a long duration tactile user input category.

16. The computer-readable medium of claim 14, wherein the computer-executable instructions cause the processing system to determine the selected graphical element by identifying a highest priority graphical element of the plurality of selectable graphical elements as the selected graphical element when the temporal classification comprises a short duration tactile user input category.

17. The computer-readable medium of claim 16, wherein the computer-executable instructions cause the processing system to obtain current status information characterizing a current operating state of an aircraft from one or more systems onboard the aircraft and identify the highest priority graphical element based at least in part on the current status information.

18. The computer-readable medium of claim 14, wherein:
  the second category comprises a long duration tactile user input; and
  the threshold distance dynamically increases with respect to a duration of the long duration tactile user input.

19. A system comprising:
  a display device having a graphical user interface (GUI) display depicted thereon;
  a user interface to receive a tactile user input with respect to the GUI display; and
  a processing system coupled to the display device and the user interface to identify a plurality of selectable graphical elements on the GUI display within a threshold distance of the tactile user input, classify the tactile user input into one of a plurality of categories based on a temporal characteristic associated with the tactile user input, resulting in a temporal classification of the tactile user input, determine a selected graphical element of the plurality of selectable graphical elements within the threshold distance of the tactile user input on the display device in accordance with the temporal classification of the tactile user input, and update the GUI display to reflect user selection of the selected graphical element, wherein the processing system is configurable to determine the selected graphical element by:
    identifying a priority graphical element of the plurality of selectable graphical elements as the selected graphical element when the temporal classification of the tactile user input comprises a first category of the plurality of categories; and
    displaying a deconfliction menu comprising the plurality of selectable graphical elements to identify the selected graphical element as a first graphical element of the plurality of selectable graphical elements responsive to sub sequent user selection of the first graphical element from the deconfliction menu when the temporal classification of the tactile user input comprises a second category of the plurality of categories.

20. The method of claim 1, wherein:
the second category comprises a long duration tactile user input; and
the threshold distance dynamically increases with respect to a duration of the long duration tactile user input.

* * * * *